(12) United States Patent
Porat et al.

(10) Patent No.: US 9,197,473 B2
(45) Date of Patent: Nov. 24, 2015

(54) PREAMBLE WITH MODIFIED SIGNAL FIELD (SIG) FOR USE IN WIRELESS COMMUNICATIONS

(71) Applicant: Broadcom Corporation, Irvine, CA (US)

(72) Inventors: Ron Porat, San Diego, CA (US); Nihar Jindal, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/297,739

(22) Filed: Jun. 6, 2014

(65) Prior Publication Data
US 2014/0362935 A1    Dec. 11, 2014

Related U.S. Application Data

(60) Provisional application No. 61/831,789, filed on Jun. 6, 2013, provisional application No. 61/870,606, filed on Aug. 27, 2013, provisional application No. 61/873,512, filed on Sep. 4, 2013, provisional application No. 61/888,967, filed on Oct. 9, 2013, provisional application No. 61/898,211, filed on Oct. 31, 2013.

(51) Int. Cl.
*H04L 5/00* (2006.01)
*H04L 27/26* (2006.01)
*H04L 29/06* (2006.01)

(52) U.S. Cl.
CPC ............ *H04L 27/2602* (2013.01); *H04L 5/003* (2013.01); *H04L 69/22* (2013.01); *Y02B 60/50* (2013.01)

(58) Field of Classification Search
CPC ..... H04L 5/0046; H04L 5/0048; H04L 5/003; H04L 27/2602; H04L 69/22; H04L 27/2601; H04J 1/00; Y02B 60/50
See application file for complete search history.

(56) References Cited

U.S. PATENT DOCUMENTS

| 5,815,488 | A  | * | 9/1998  | Williams et al. | 370/206 |
|-----------|----|---|---------|-----------------|---------|
| 6,347,120 | B1 | * | 2/2002  | Sakoda          | 375/259 |
| 7,639,600 | B1 | * | 12/2009 | Lou et al.      | 370/208 |
| 7,693,228 | B2 | * | 4/2010  | Aldana et al.   | 375/267 |
| 7,957,474 | B2 | * | 6/2011  | Waters et al.   | 375/260 |
| 2006/0223476 | A1 | * | 10/2006 | Song et al.  | 455/277.2 |
| 2007/0189263 | A1 | * | 8/2007  | Izumi et al. | 370/350 |
| 2008/0002780 | A1 | * | 1/2008  | Yu et al.    | 375/267 |
| 2008/0279220 | A1 | * | 11/2008 | Wang         | 370/500 |
| 2011/0090860 | A1 | * | 4/2011  | Ihm et al.   | 370/329 |

(Continued)

*Primary Examiner* — Jean B Corrielus
(74) *Attorney, Agent, or Firm* — Garlick & Markison; Shayne X. Short

(57) ABSTRACT

A wireless communication device ('device') is configured to generate an OFDM/A packet that includes at least one OFDM/A symbol that includes at least one SIG having SIG information modulated on only even (or odd) sub-carriers and does not include any information modulated on odd (or even) sub-carriers of a set of OFDM/A sub-carriers. The set of OFDM/A sub-carriers may be all or less than all of available sub-carriers. The device may generate the packet to include a preamble and a payload such that the payload, which may be composed of at least one additional OFDM/A symbol, includes data modulated on some or all of the sub-carriers of the set of OFDM/A sub-carriers. The device can modulate and transmit SIG information and data differently within the preamble and the payload (e.g., with higher ordered modulation or MCS for the data and less power per sub-carrier than for the preamble).

20 Claims, 9 Drawing Sheets

(56) References Cited

U.S. PATENT DOCUMENTS

| | | | |
|---|---|---|---|
| 2011/0110437 A1* | 5/2011 | Kim | 375/259 |
| 2013/0114756 A1* | 5/2013 | Jia et al. | 375/295 |
| 2013/0315342 A1* | 11/2013 | Um et al. | 375/295 |
| 2015/0009979 A1* | 1/2015 | Noh et al. | 370/338 |

* cited by examiner

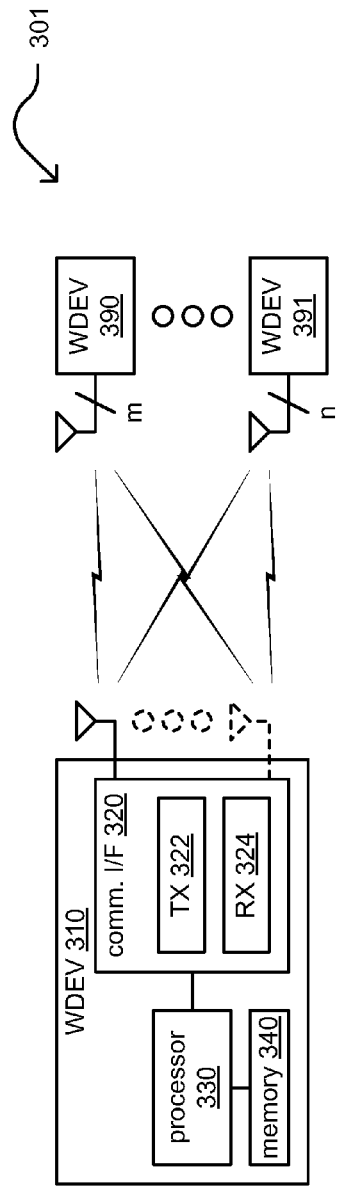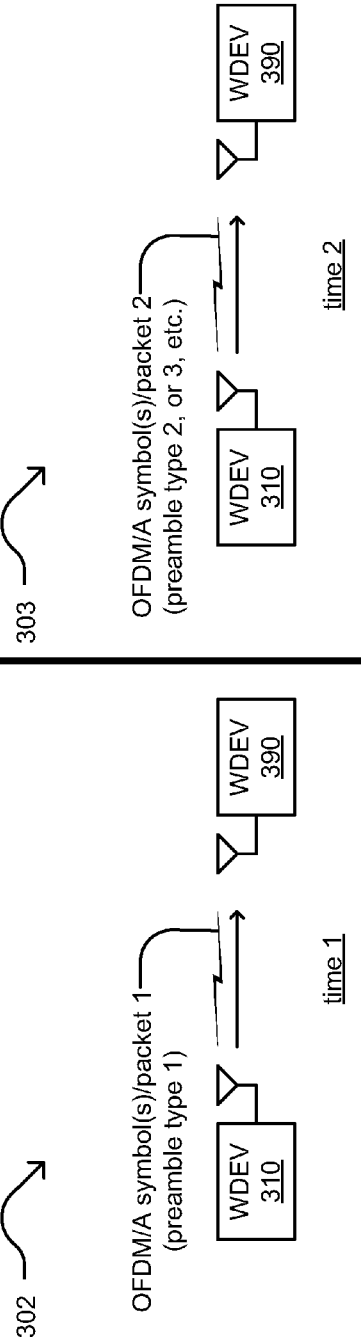

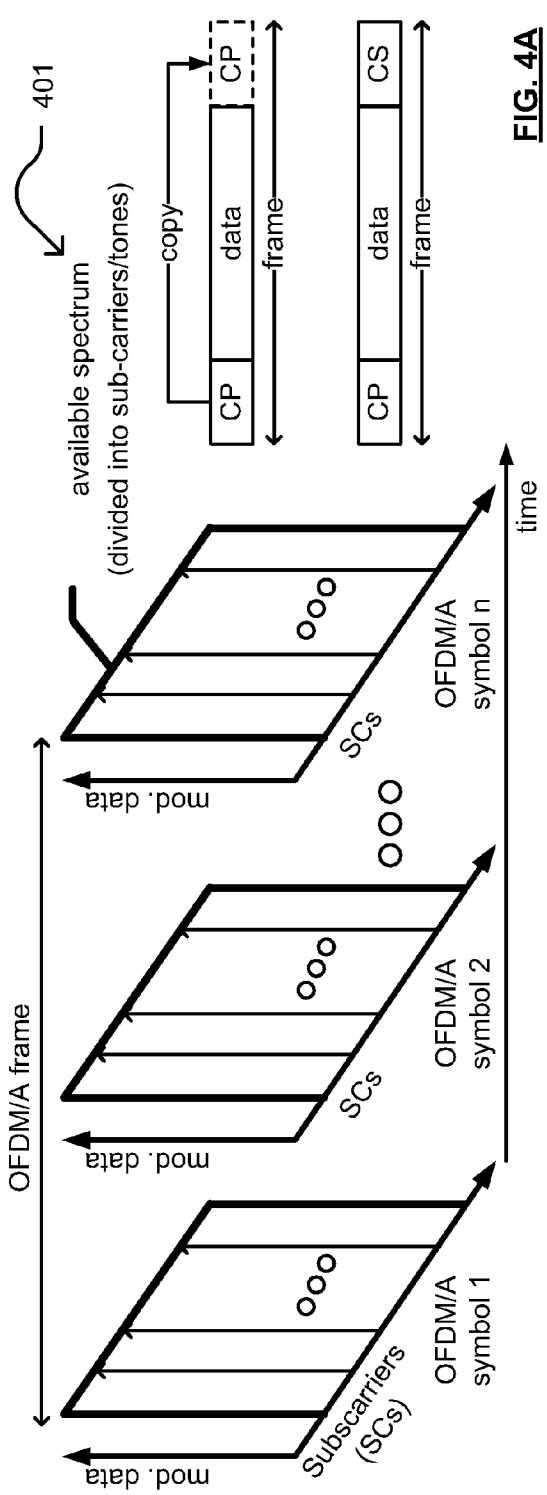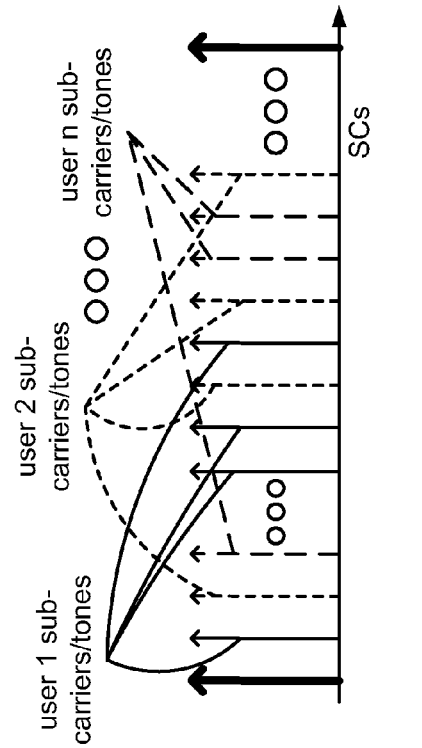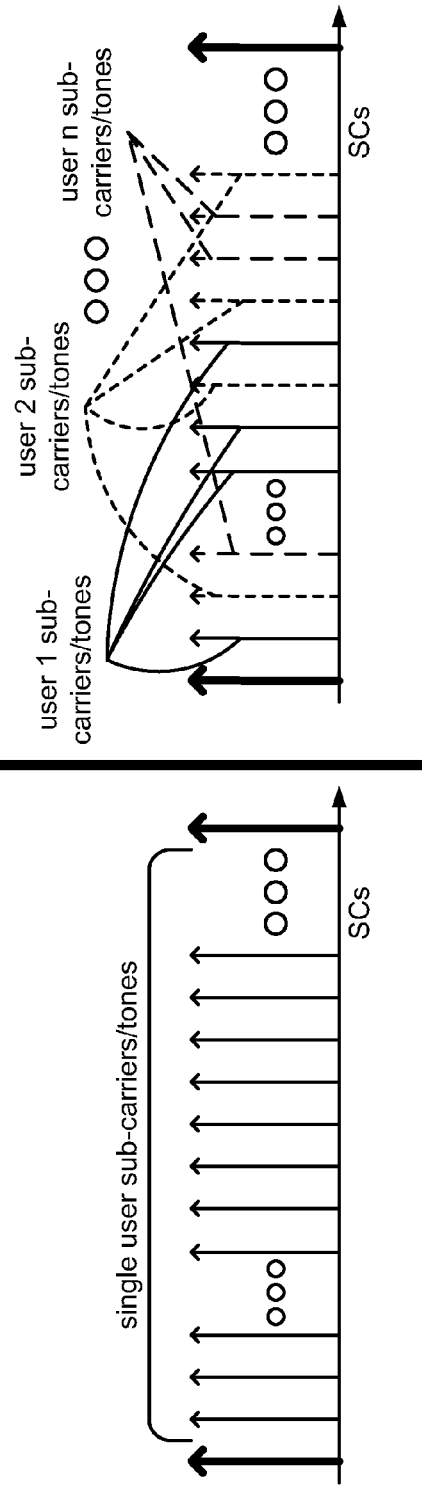
FIG. 4A
FIG. 4B
FIG. 4C

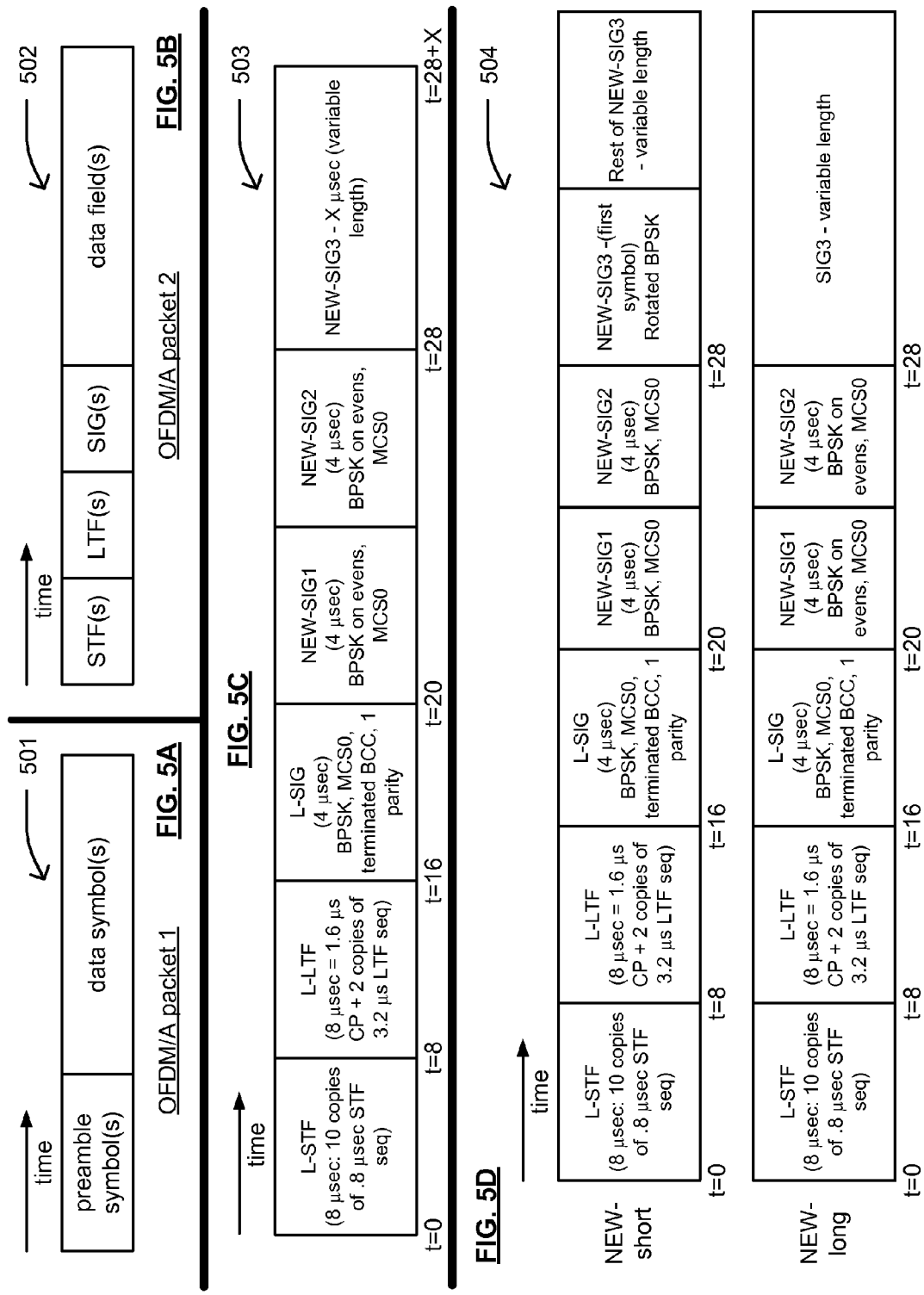

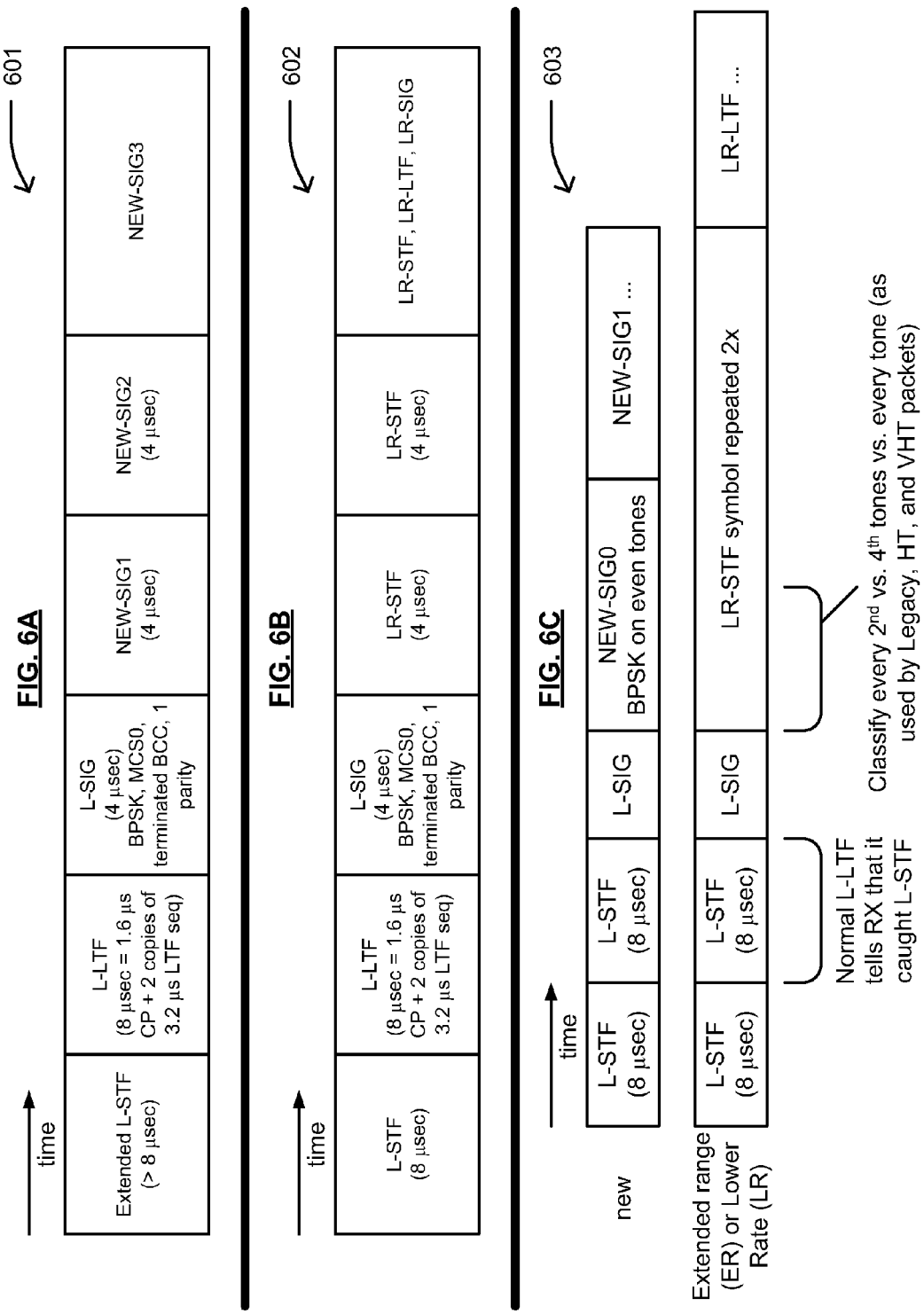

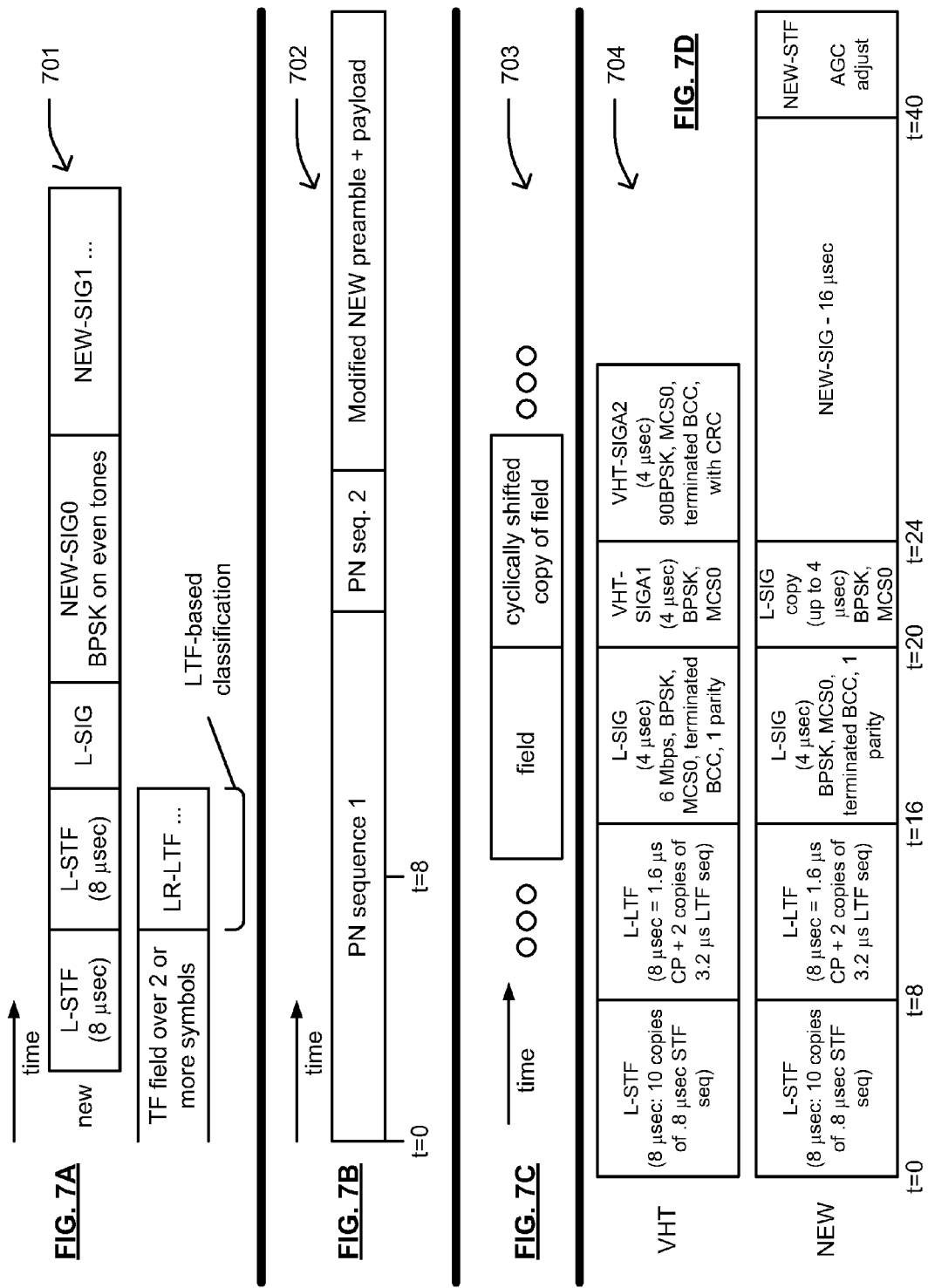

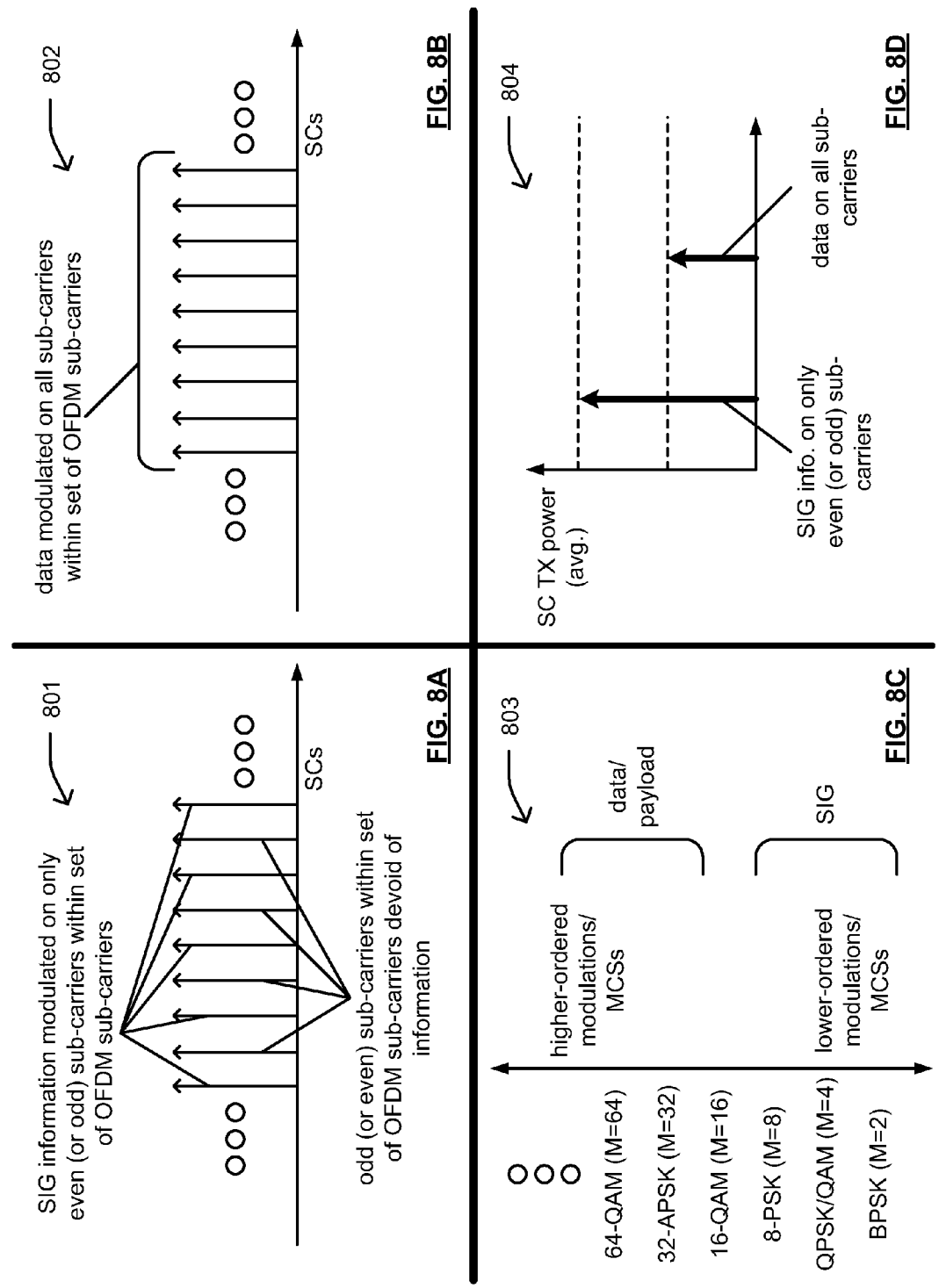

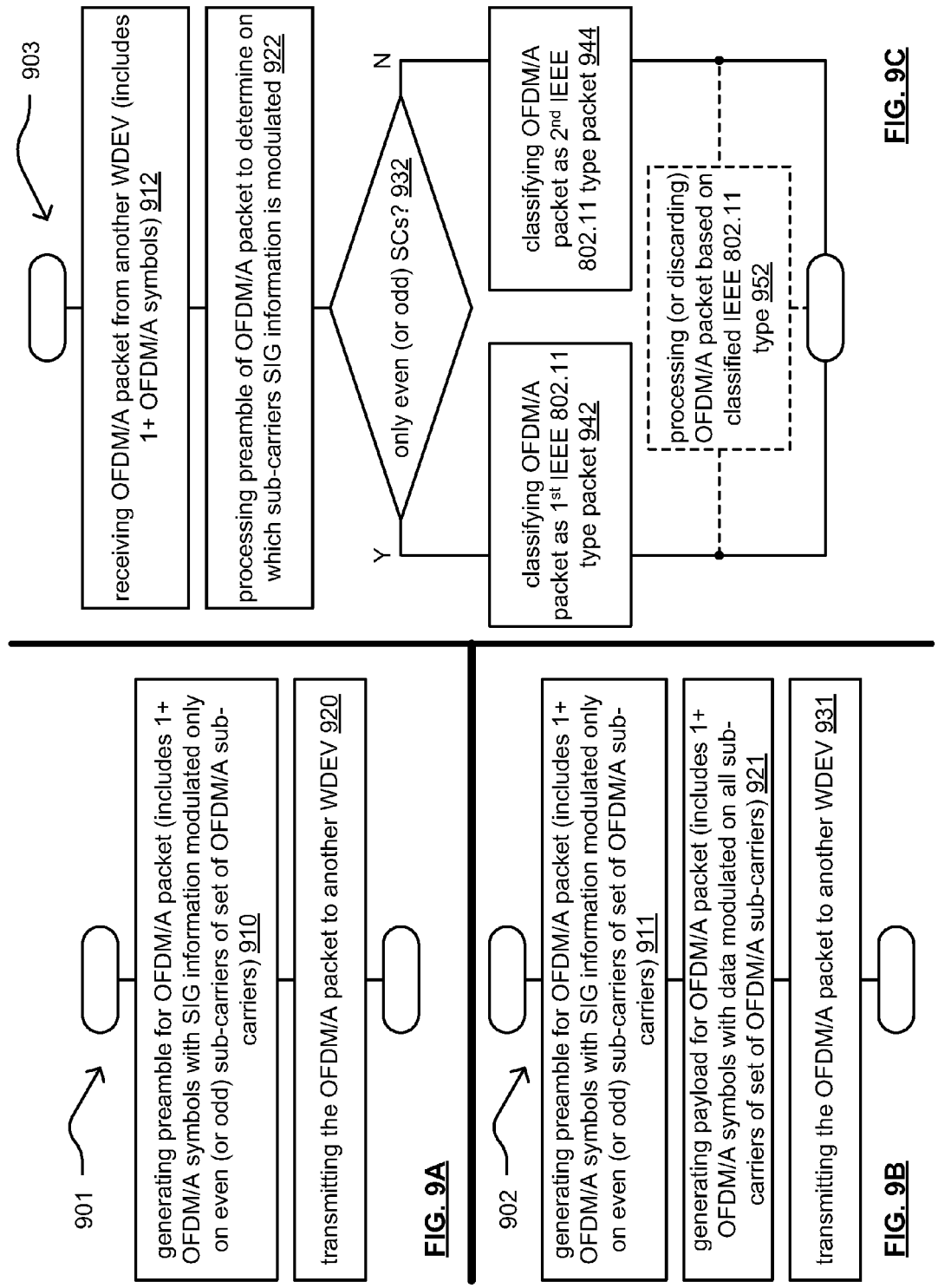

PREAMBLE WITH MODIFIED SIGNAL FIELD (SIG) FOR USE IN WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to U.S. Provisional Patent App. Ser. No. 61/831,789, entitled "Next generation within single user, multiple user, multiple access, and/or MIMO wireless communications," filed Jun. 6, 2013; U.S. Provisional Patent App. Ser. No. 61/870,606, entitled "Next generation within single user, multiple user, multiple access, and/or MIMO wireless communications," filed Aug. 27, 2013; U.S. Provisional Patent App. Ser. No. 61/873,512, entitled "Orthogonal frequency division multiple access (OFDMA) and duplication signaling within wireless communications," filed Sep. 4, 2013; U.S. Provisional Patent App. Ser. No. 61/888,967, entitled "Next generation within single user, multiple user, multiple access, and/or MIMO wireless communications," filed Oct. 9, 2013; and U.S. Provisional Patent App. Ser. No. 61/898,211, entitled "Next generation within single user, multiple user, multiple access, and/or MIMO wireless communications," filed Oct. 31, 2013, all of which are hereby incorporated herein by reference in their entirety and made part of the present U.S. Utility patent application for all purposes.

BACKGROUND

1. Technical Field

The present disclosure relates generally to communication systems; and, more particularly, to generation and processing of communications within single user, multiple user, multiple access, and/or MIMO wireless communications.

2. Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x(where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

As new communication standards, protocols, and recommended practices continue to be developed, wireless communication devices continue to be developed that can operate within such new communication standards, protocols, and recommended practices and sometimes be backward-compatible with new communication standards, protocols, and recommended practices. The prior art does not provide fully effective means by which communications may be distinguished among various communication standards, protocols, and recommended practices and processed accordingly.

BRIEF DESCRIPTION OF THE SEVERAL VIEWS OF THE DRAWINGS

FIG. 3A is a diagram illustrating an example of communication between wireless communication devices.

FIG. 3B is a diagram illustrating another example of communication between wireless communication devices.

FIG. 3C is a diagram illustrating another example of communication between wireless communication devices.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 5A is a diagram illustrating an example of an OFDM/A packet.

FIG. 5B is a diagram illustrating another example of an OFDM/A packet of a second type.

FIG. 5C is a diagram illustrating an example of a preamble of an OFDM/A packet that includes at least one variable length signal field (SIG).

FIG. 5D is a diagram illustrating another example of a preamble of an OFDM/A packet that includes at least one variable length signal field (SIG).

FIG. 6A is a diagram illustrating an example of a preamble of an OFDM/A packet tailored for extended range and/or lower rate applications.

FIG. 6B is a diagram illustrating another example of a preamble of an OFDM/A packet tailored for extended range and/or lower rate applications.

FIG. 6C is a diagram illustrating another example of a preamble of an OFDM/A packet tailored for extended range and/or lower rate applications.

FIG. 7A is a diagram illustrating another example of a preamble of an OFDM/A packet tailored for extended range and/or lower rate applications.

FIG. 7B is a diagram illustrating another example of a preamble of an OFDM/A packet tailored for extended range and/or lower rate applications.

FIG. 7C is a diagram illustrating an example of a preamble of an OFDM/A packet that includes at least one cyclically shifted copy of at least one field.

FIG. 7D is a diagram illustrating another example of a preamble of an OFDM/A packet that includes at least one cyclically shifted copy of at least one field.

FIG. 8A is a diagram illustrating an example of SIG information modulated on only even (or odd) sub-carriers (SCs) within a set of OFDM/A sub-carriers.

FIG. 8B is a diagram illustrating an example of data modulated on all sub-carriers (SCs) within a set of OFDM/A sub-carriers.

FIG. 8C is a diagram illustrating an example of different types of modulations or modulation coding sets (MCSs) used for modulation of information within different fields within an OFDM/A packet.

FIG. 8D is a diagram illustrating an example of different types of transmission (TX) power used for different sub-carriers within at least one OFDM/A symbol of at least one OFDM/A packet.

FIG. 9A is a diagram illustrating an embodiment of a method for execution by at least one wireless communication device.

FIG. 9B is a diagram illustrating another embodiment of a method for execution by at least one wireless communication device.

FIG. 9C is a diagram illustrating another embodiment of a method for execution by at least one wireless communication device.

DETAILED DESCRIPTION

Figure 1:
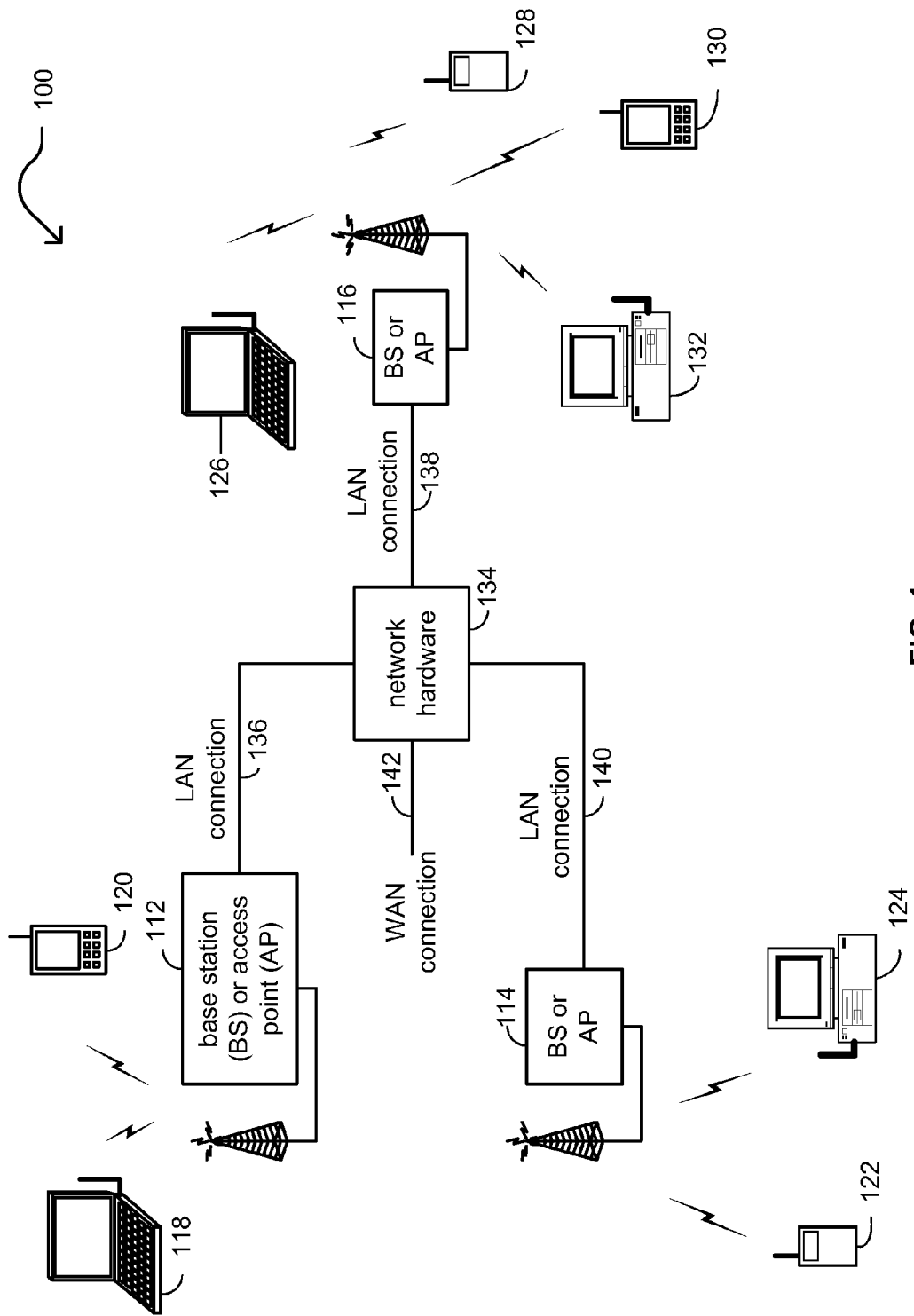
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor implemented within one of the devices (e.g., any one of the WDEVs 118-132 and BSs or APs 112-116) is configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or devices 210-234 when referring to wireless communication devices 210-234; or with respect to FIG. 3 below, use of "device 310" may alternatively be used when referring to wireless communication device 310, or "devices 390 and 391 (or 390-391)" when referring to wireless communication devices 390 and 391 or WDEVs 390 and 391).

The processor of any one of the various devices, WDEVs 118-132 and BSs or APs 112-116, may be configured to support communications via at least one communication interface with any other of the various devices, WDEVs 118-132 and BSs or APs 112-116.

In an example of operation, one of the devices (e.g., any one of WDEVs 118-132 and BSs or APs 112-116) includes a communication interface and a processor. The processor is configured to generate a preamble for an orthogonal frequency division multiplexing (OFDM) (or orthogonal frequency division multiple access (OFDMA)) packet that includes at least one OFDM symbol that includes at least one signal field (SIG) having SIG information modulated on only even sub-carriers and are devoid of any information modulated on odd sub-carriers of a set of OFDM sub-carriers. Note that any reference made herein to OFDM may be applied for OFDMA, and vice versa. The processor is configured to transmit the OFDM packet to another wireless communication device (e.g., any other one of WDEVs 118-132 and BSs or APs 112-116) via the communication interface.

In some implementations, the processor is configured to generate the OFDM packet to include both the preamble and a payload. The payload includes data modulated on all (or some) sub-carriers of the set of OFDM sub-carriers. The processor is configured to transmit the OFDM packet to the other wireless communication device via the communication interface using a first transmission power for each of the even sub-carriers that includes the modulated SIG information in the preamble that is approximately double (e.g., on average) a second transmission power for each of the sub-carriers that includes the modulated data in the payload. Generally, the device may be configured to transmit different portions of the packet power per sub-carrier.

Also, in some implementations, the processor is configured to generate the OFDM packet to include the preamble and a payload. In such implementations, the payload includes data modulated on all sub-carriers of the set of OFDM sub-carriers using first modulation coding set (MCS) that is a higher ordered MCS (e.g., higher density, includes more constellation points, etc.) and includes a higher number of constellation points relative to second MCS used for the SIG information modulated on only the even sub-carriers.

Also, the processor may be configured to generate different types of packets for transmission at different times. A first type of packet may be compliant with a first IEEE 802.11 communication standard, and a second type of packet may be compliant with a second IEEE 802.11 communication standard.

Also, the processor may be configured to generate a packet that includes at least one SIG of a variable length. The length of the SIG may be indicated within at least one field of the packet that precedes the SIG. This at least one field may be implemented using at least one other OFDM/A symbol than that which is used for the SIG.

In yet another example of operation, one of the devices (e.g., any one of WDEVs 118-132 and BSs or APs 112-116) includes a communication interface and a processor such that the processor is configured to receive, via the communication interface and from another wireless communication device, an OFDM (or OFDMA) packet that includes at least one OFDM symbol. The processor is configured to process a preamble of the OFDM packet within the at least one OFDM symbol to determine on which sub-carriers of a set of OFDM sub-carriers signal field (SIG) information is modulated. The processor may be configured to compare the energy of the various sub-carriers and/or detect on which sub-carriers there is energy.

When SIG information is modulated on only even sub-carriers of the set of OFDM sub-carriers and odd sub-carriers of the set of OFDM sub-carriers are devoid of any information modulated thereon, the processor is configured to classify the OFDM packet as first IEEE 802.11 communication standard based packet and process the OFDM packet based on the first IEEE 802.11 communication standard. Alternatively, when SIG information is modulated on all sub-carriers of the set of OFDM sub-carriers, the processor is configured to classify the OFDM packet as second IEEE 802.11 communication standard based packet and process the OFDM packet based on the second IEEE 802.11 communication standard. The processor may also be configured to perform any additional processing operations based on the particular IEEE 802.11 communication standard by which the packet has been classified. The length of a variable length SIG may be indicated using other means including using a 90 degree phase rotation of a last OFDM symbol of the SIG relative to at least one other OFDM symbol that precedes the last OFDM symbol of the SIG.

Figure 2:
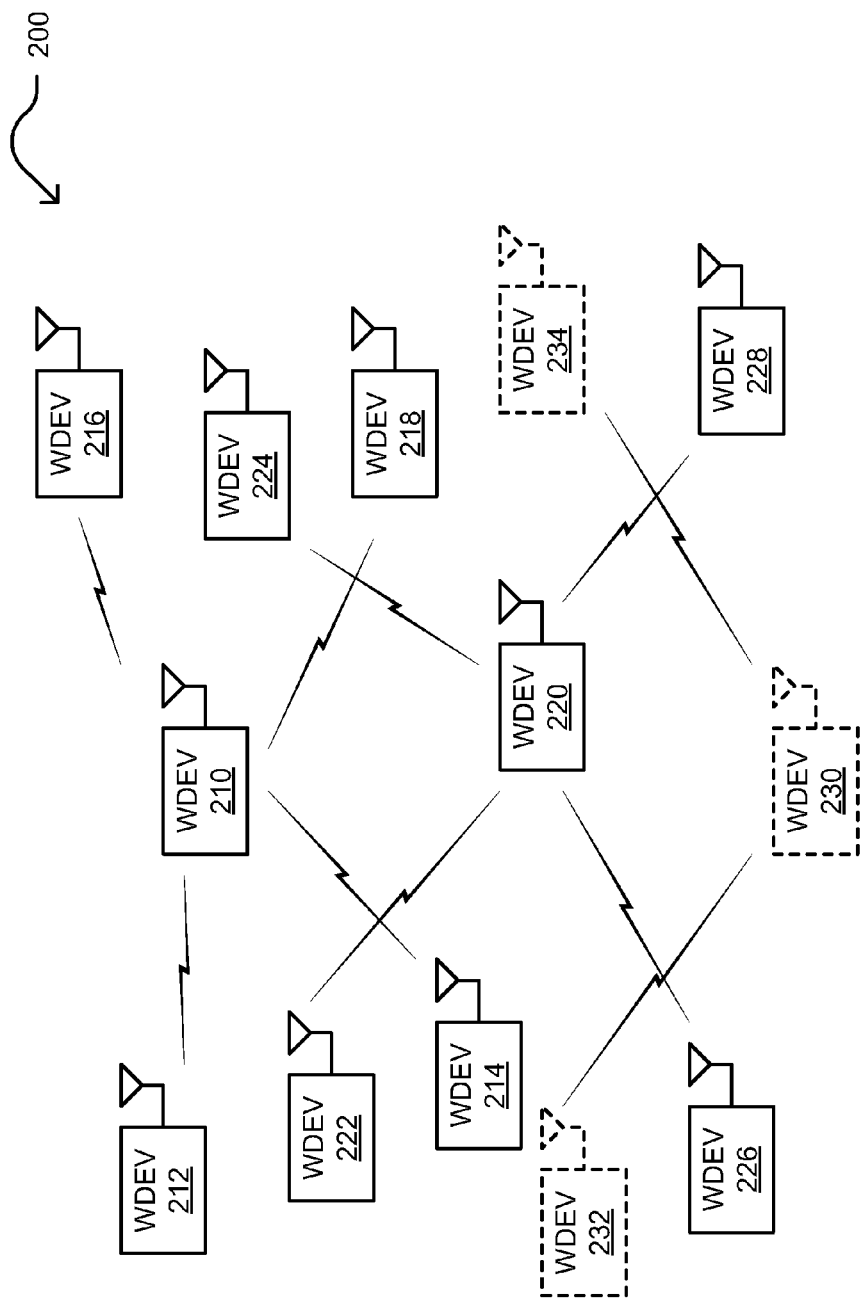
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and AP are packed in a given area (e.g., which may be a relatively area [indoor or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

Any one of the wireless communication devices (or simply, 'devices') in this diagram may be configured to include a communication interface and the processor. The processor may be configured to generate and interpret OFDM packets. An OFDM packet includes a preamble that includes at least one OFDM symbol that includes at least one signal field (SIG) having SIG information modulated on only even sub-carriers and are devoid of any information modulated on odd sub-carriers of a set of OFDM sub-carriers. The processor may also be configured to receive and transmit such OFDM packets to and from another wireless communication device via the communication interface.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one frame (e.g., using a transmitter 322 and a receiver 324). The wireless communication device 310 also includes a processor 330, and an associated memory 340, to execute various operations including interpreting at least one frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and 391 may each include more than one antenna for transmitting and receiving of at least one frame (e.g., WDEV 390 may include m antennae, and WDEV 391 may include n antennae).

In an example of operation, the processor 330 is configured to generate a preamble for an OFDM packet that includes at least one OFDM symbol that includes at least one signal field (SIG) having SIG information modulated on only even sub-carriers and are devoid of any information modulated on odd sub-carriers of a set of OFDM sub-carriers. The processor 330 is also configured to transmit the OFDM packet to another wireless communication device (e.g., 390) via the communication interface 320.

In another example of operation, the processor is 330 configured to generate the OFDM packet that includes the preamble and a payload. The payload may be configured to include data modulated on all sub-carriers of the set of OFDM sub-carriers. The processor 330 is also configured to transmit the OFDM packet to the other wireless communication device via the communication interface 320 using a first transmission power for each of the even sub-carriers that includes the modulated SIG information in the preamble that is approximately double a second transmission power for each of the sub-carriers that includes the modulated data in the payload.

In another example of operation, the processor is 330 configured to generate the OFDM packet that includes the preamble and a payload. The payload includes data modulated on all sub-carriers of the set of OFDM sub-carriers using first modulation coding set (MCS) that is a higher ordered MCS and includes a higher number of constellation points relative to second MCS used for the SIG information modulated on only the even sub-carriers.

In another example of operation, the processor is 330 configured to receive, via the communication interface 320 and from another wireless communication device (e.g., 390), an OFDM packet that includes at least one OFDM symbol. Processor 330 is configured to process a preamble of the OFDM packet within the at least one OFDM symbol to determine on which sub-carriers of a set of OFDM sub-carriers signal field (SIG) information is modulated. When SIG information is modulated on only even sub-carriers of the set of OFDM sub-carriers, and odd sub-carriers of the set of OFDM sub-carriers are devoid of any information modulated thereon, processor 330 is configured to classify the OFDM packet as first IEEE 802.11 communication standard based packet and process the OFDM packet based on the first IEEE 802.11 communication standard. Alternatively, when SIG information is modulated on all sub-carriers of the set of OFDM sub-carriers, processor 330 is configured to classify the OFDM packet as second IEEE 802.11 communication standard based packet and process the OFDM packet based on the second IEEE 802.11 communication standard. Processor 330 may also be configured to perform any additional processing operations based on the particular IEEE 802.11 communication standard by which the packet has been classified.

FIG. 3B is a diagram illustrating another example 302 of communication between wireless communication devices. A processor of device 310 is configured to transmit and receive, via a communication interface of device 310, different types of signals to and from at least one other wireless communication device (e.g., WDEV 390). At or during a first time (time 1), device 310 is configured to transmit at least one OFDM packet composed of at least one OFDM symbol and having a preamble of the first type to device 390.

FIG. 3C is a diagram illustrating another example 303 of communication between wireless communication devices. At or during a second time (time 2), device 310 is configured to transmit another at least one OFDM packet composed of another at least one OFDM symbol and having another preamble of another type (e.g., a second, third, etc.) to device 390.

Note also that while only one direction of communication is shown in FIG. 3B and FIG. 3C that communication in the opposite direction, from device 390 to device 310, maybe performed in other examples, and bidirectional communication may be supported between devices 310 and 390.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and frames. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) (shown in right hand side of FIG. 4A) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets or frames (note: packet and frame may be used interchangeably) are transmitted between a transmitter device and a receiver device, all of the sub-carriers or tones are dedicated for use in transmitting modulated data between the transmitter and receiver devices. In a multiple user system in which one or more OFDM symbols or OFDM frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first frame, a second assignment for second frame, etc.). An OFDM frame may include more than one OFDM symbol. Similarly, an OFDMA frame may include more than one OFDMA symbol. In addition, such sub-carrier/tone assignment may be dynamic among different respective symbols within a given frame or superframe (e.g., a first assignment for a first OFDMA symbol within a frame, a second assignment for a second OFDMA symbol within the frame, etc.). Generally speaking, an OFDMA symbol is a particular type of OFDM symbol, and general reference to OFDM symbol herein includes both OFDM and OFDMA symbols (and general reference to OFDM frame herein includes both OFDM and OFDMA frames).

Generally, a communication device may be configured to include a processor configured to process received OFDM or OFDMA symbols and/or frames and to generate such OFDM or OFDMA symbols and/or frames. The processor of the communication device is configured to generate and interpret OFDM packets composed of OFDM symbols. These diagrams show the general structure of OFDM or OFDMA sub-carriers, symbols, frames are packets, etc. Again, note that any reference made herein to OFDM may be applied for OFDMA, and vice versa.

In prior IEEE 802.11 legacy prior standards, protocols, and/or recommended practices, including those that operate in the 2.4 GHz and 5 GHz frequency bands, certain preambles are used. For use in the development of a new standard, protocol, and/or recommended practice, a new preamble design is presented herein that permits classification of all current preamble formats while still enabling the classification of a new format by new devices.

FIG. 5A is a diagram illustrating an example 501 of an OFDM/A packet. This packet includes at least one preamble symbol followed by at least one data symbol. The at least one preamble symbol includes information for use in identifying, classifying, and/or categorizing the packet for appropriate processing.

FIG. 5B is a diagram illustrating another example 502 of an OFDM/A packet of a second type. This packet also includes a preamble and data. The preamble is composed of and/or short training field (STF), at least one long training field (LTF), and at least one signal field (SIG). The data is composed of at least one data field. In both this example 502 and the prior example 501, the at least one data symbol and/or the at least one data field may generally be referred to as the payload of the packet.

Various examples are described below for possible designs of a preamble for use in wireless communications as described herein.

FIG. 5C is a diagram illustrating an example 503 of a preamble of an OFDM/A packet that includes at least one variable length signal field (SIG). The signal field (SIG) field of variable length is depicted by NEW-SIG3. Generally speaking, NEW may be viewed as referring to a next-generation communication standard, protocol, and/or recommended practice of IEEE 802.11 relative to any prior or legacy communication standard, protocol, and/or recommended practice of IEEE 802.11. The preamble begins with a legacy short training field (STF) (shown as L-STF) and a legacy long training field (LTF) (shown as L-LTF). The legacy signal field (SIG) field (L-SIG) rate indicates 6 Mbps. When a wireless communication device that is compatible with a newer communication standard, protocol, and/or recommended practice of IEEE 802.11, (e.g., which may generally referred to as a NEW device, a wireless communication device, or simply as a 'device') does not decode the L-SIG properly, the next generation receiver wireless communication device is configured to continue to check for the presence of a new preamble (e.g., preamble based on a newer communication standard, protocol, and/or recommended practice of IEEE 802.11).

In this example 503, the NEW-SIG1 and NEW-SIG2 fields are 64 FFT symbols with 0.8 micro-second (μsec or μs) guard interval (GI). Symbols are binary phase shift keying (BPSK) modulated only on the even tones (note: tones and sub-carriers may be used interchangeably) within the set [−26:−1 1:26] based on orthogonal frequency division multiplexing (OFDM) signaling. Note that many examples herein describe modulation of information on only even sub-carriers of a set of OFDM sub-carriers, and modulation of information on only odd sub-carriers of the set of OFDM sub-carriers in alternative embodiments. Also, the set of OFDM sub-carriers may include all or less than all of the available sub-carriers for use in OFDM signaling.

A processor within a device may be configured to perform time-domain correlation processing (1.6 μs (micro-seconds) delay) on two new signal fields (SIGs), NEW-SIG1 and NEW-SIG2. The repetition may be implemented to occur within each OFDM symbol, but not across OFDM symbols for using classification of the packet as being compliant with one type or another of IEEE 802.11 communication standard (e.g., classified as either a new type of packet or a legacy type of packet). In parallel, the device may also be configured to perform checking for rotated BPSK, to check for HT and VHT preambles.

The four odd pilot tones [−21 −7 +7 +21] in NEW-SIG1 and NEW-SIG2 can also be modulated in alternative examples, if desired. Such an example would include modulation of SIG information on even sub-carriers of a set that includes at less than all of the available OFDM sub-carriers since at least some of the sub-carriers are used for modulation of pilot related data. This may be done to have the same pilot tones in NEW-SIG1 and NEW-SIG2 as in L-SIG. If this is done, then classification of the packet may alternatively be performed in the frequency domain by comparing the energy of the NEW modulated tones versus the energy on tones used for non-NEW preambles [−26:−1 1:26].

A subsequent new type of signal field (SIG), NEW-SIG3, consists of a variable number of 64 FFT symbols, each binary phase shift keying (BPSK) modulated and with an extended GI larger than 0.8 (e.g. 3.2 μs—3.2 μs chosen since it is the GI used for a 4× longer DATA symbols).

The NEW-SIG3 is composed of a variable number of OFDM symbols. The number of OFDM symbols is indicated by either: (1) Using one or more bits in NEW-SIG1/2 to explicitly signal # of symbols; or (2) Applying 90 degree rotation to only the last OFDM symbol in NEW-SIG3.

The length field from L-SIG is repeated within NEW-SIG3, because the device may be configured to such that it is not assumed to have decoded L-SIG properly.

In terms of coding, either of the following can be used: (1) Single BCC codeword that spans NEW-SIG1, NEW-SIG2, and all of NEW-SIG3; or (2) BCC codeword that spans NEW-SIG1 and NEW-SIG2, and a separate BCC codeword for NEW-SIG3. Code rates can be different. Note that each code can either be implemented as a terminated or tail-biting code.

In an alternative design similar to that which is described above, symbols in NEW-SIG3 can either use the normal 0.8 μs GI or a longer 3.2 μs GI. One or more bits in NEW-SIG1/2 are used to signal which GI length is used in NEW-SIG3. If a long GI is used for NEW-SIG3 symbols, then the length field from L-SIG may be repeated within NEW-SIG3 (because is not assumed to have decoded L-SIG properly). Length field from L-SIG is not repeated if normal GI is used for NEW-SIG3 symbols.

FIG. 5D is a diagram illustrating another example 504 of a preamble of an OFDM/A packet that includes at least one variable length signal field (SIG). This design has two preamble types, short and long, with long type being of the form of design that L-SIG rate indicates 6 Mbps, and the two the designs differ beginning at NEW-SIG1.

NEW short preamble: The NEW-SIG1, NEW-SIG2, and NEW-SIG3 all use 64 FFT 0.8 μs GI symbols with BPSK modulation on all tones [−26:−1 1:26]. The first symbol of NEW-SIG3 is 90 degree rotated, so that a device can classify NEW-normal delay spread preamble.

NEW long preamble: The NEW-SIG1 and NEW-SIG2 are BPSK modulated only on the even tones. The NEW-SIG3 symbols are 64 FFT with 3.2 µs GI.

For each preamble type, in terms of coding can either use:

1. Single BCC R=½ code that spans NEW-SIG1, NEW-SIG2, and all of NEW-SIG3.
2. Single BCC R=½ code that spans NEW-SIG1 and NEW-SIG2, and a separate codeword for NEW-SIG3.

Note that each code can either be terminated or tail-biting.

For each preamble type, NEW-SIG3 can either be fixed or variable length. If variable length, the number of symbols can either be explicitly signaled during NEW-SIG1/2, or the last symbol of NEW-SIG3 can be 90 degree rotated. For a short preamble, if the first symbol of NEW-SIG3 is the last symbol, this can be indicated with a 90 degree rotation on only a subset of the tones (e.g., tones in upper half of spectrum). An alternative implementation operates for NEW-SIG3 of short preamble to use all 90 degree rotated BPSK symbols, and the device is configured to determine end of NEW-SIG3 by looking for the STF symbol which comes immediately after NEW-SIG3 and which is un-rotated BPSK.

In order to classify legacy vs. High Throughput (HT) vs. Very High Throughput (VHT) vs. a Next Generation type, a device is configured to check for all of the following possibilities:

1. Rate >6 Mbps in L-SIG indicates legacy. Rate of 6 Mbps means packet could be any of the possible types.
2. 90 degree rotation of symbol following L-SIG indicates HT.
3. 90 degree rotation of $2^{nd}$ symbol following L-SIG indicates VHT.
4. 90 degree rotation of $3^{rd}$ symbol following L-SIG indicates NEW short.
5. Time domain repetition within 2 symbols following L-SIG indicates NEW long.

In certain examples provided above, the modulation can be replaced on only the even tones of NEW-SIG1 and NEW-SIG2 with any of the following:

1. BPSK modulation on all tones with frequency-domain repetition performed within each of the 2 OFDM symbols.
2. BPSK modulation on all tones, with identical bit contents for 2 OFDM symbols (i.e., time-domain repetition).
3. BPSK modulation on all tones, where some or all tones carry a pre-determined Pseudo-Noise (PN) sequence in frequency domain. If only some tones carry PN sequence, remainder of tones can be used for data.

For any of the above options, note that different amplitudes can be used on different sets of tones (e.g., sqrt(1.5) on even tones and sqrt(0.5) on odd tones). This can be performed in order to provide extra differentiation from legacy/HT/VHT symbols that only use unity amplitude.

Classification of a packet may also be made based on characteristics of a short and long guard interval (GI) on SIG3. Certain examples above describe above define a SIG3 field with short (0.8 µs) or long (3.2 µs) guard interval (GI). A receiver device (e.g., wireless station (STA)) will know before reaching the SIG3 field what type of GI was used in a communication. Several options may be employed including any one or more of: SIG1/2 fields have a separate encoder than SIG3, pilots on SIG1 and SIG2 used to convey one bit of information.

Note also that if SIG1/2 fields have a separate encoder than SIG3, any one of several options can be used with any one or more of: standard terminated binary convolutional code (BCC transmission of a subset of termination bits (e.g., 3 of normal 6 tail bits), terminated BCC with up to 12 bits punctured throughout the codeword (puncturing pattern specific to the short codeword, as opposed to the standard puncturing pattern used in the 802.11 spec), tailbiting BCC, etc.

Also, other methods to signal GI that allow single encoder across SIG 1/2/3 fields may be used with a short GI bit signaled using a fixed set of subcarriers in SIG1/2. These subcarriers are used to convey a single bit, and that single bit is repetition coded over this set of subcarriers (peak to average power ratio (PAPR) lowering sequence can be applied on top of this repetition on said subcarriers). These subcarriers are not used by the BCC codeword spanning SIG 1/2/3. Set of subcarriers can include pilot tones. Alternatively, a signal short GI bit may be generated by repetition coding on the imaginary components of the even tones used in SIG 1/2. Imaginary component weakly loaded compared to real component (on all tones) so that rotated BPSK detection not significantly affected. Alternatively, a communication device can also use the real component transmitted on pilot tones.

An extended range preamble or lower rate preamble may be employed in some situations. It may be desirable in some implementations also to have an extended range preamble that is designed to work at the lower operating SNR's required for effective coding rates <MCS0 and/or narrower bandwidths.

In addition to any of the SIG field preamble types already described, it may be desirable also to have a lower rate preamble that is designed to work at lower operating signal to interference noise ratio (SINR) than what's achievable with MCS0 rate (e.g., that is the lowest rate currently used for the previous preamble designs). Such low operating SINR can be used for extended range or for high overlapping basic services set (OBSS) interference cases. The lower data rates expected are MCS0 with repetition 4 and repetition 2.

FIG. 6A is a diagram illustrating an example 601 of a preamble of an OFDM/A packet tailored for extended range and/or lower rate applications. In this example 601, the L-STF field is increased in length (e.g., further repetition of 0.8 µs sequence that L-STF is composed of) to allow acquisition to work at lower SNR's. Also, the NEW-SIG1/2 contents are changed to one of the following:

1. BPSK on even tones with a specified PN sequence. This may be used to allow for maximal differentiation from non-extended range HEW preamble (e.g., design 1) PN sequence can be chosen such that it does not match any valid design 1 codeword).
2. Combination of data and specified PN sequence on even tones.
3. Combination of data and specified PN sequence on every $4^{th}$ tone.
4. Time and/or frequency repetition on data, to allow lower SNR decoding.

The NEW-SIG3 is changed as follows: (1) increased time/frequency repetition and (2) different FFT size and/or GI length. Note that additional LTF's may be inserted, before and/or after NEW-SIG3.

FIG. 6B is a diagram illustrating another example 602 of a preamble of an OFDM/A packet tailored for extended range and/or lower rate applications. In this example 602, a NEW-SIG1/2 field from concept/design 1 is replaced by a low rate (LR)-STF field (e.g., a new field) with contents changed to a specific PN sequence on every $4^{th}$ tone. The PN sequence may be the same as the L-STF or different with specific design for low PAPR that allows boosting for improved acquisition.

The location of the tones could be similar to the L-STF or shifted by 2 tones (tones=2mod(4)) to allow classification relative to the L-STF. Alternatively, classification could be performed after this NEW-STF field by using a specifically designed NEW-LTF field with a sequence orthogonal to the L-LTF sequence. A receiver will need to do 3-way classification—the nested property of the design can be utilized in constructing appropriate metrics for classification:

1. The low rate preamble uses only every $4^{th}$ tone and also repeats the same information on 2 or more symbols
2. The NEW preamble as a design above that uses only even tones with different information on the 2 symbols
3. Legacy preambles use all tones with different information on the 2 symbols
4. The receiver can average the 2 symbols and then proceed to compare energy on the respective groups of tones to derive the correct preamble option. See next 2 slides for further discussion.

The LR-SIG field is preceded by the following fields:
1. Possibly extra LR-STF symbols for improved acquisition
2. Possibly more than 2 LR-LTF to improve channel estimation at very low SNR The LR-SIG field uses longer symbols (4×) for robust operation in longer delay spread and lower coding rate in-line with the lowest coding rate supported in the packet.

If desired, the LR-STF is boosted (e.g., amplified, scaled upwards, etc.) to assist in the acquisition of the low rate preamble and the required low rate signal to interference noise ratio (SINR). For example, this may be used when a low PAPR is desired for such transmissions. A search across possible STF sequences that provide low PAPR provides at least the following options. In this search, it is assumed that the tones modulated are the same tones as in the L-STF (e.g., 12 tones on 0mod(4) locations excluding the DC).

Several options of short training field (STF) sequences (e.g., shown as "stf_seq") that may be used to provide for a relatively lower PAPR are presented below:

LR-STF Sequences
PAPR=1.2 dB, stf_seq=[−1 1 2 −2−1 2 2−2−1−2−1 −1]
PAPR=1.2 dB, stf_seq=[−1 1−2 1−2−2−2−1 2 2−1 −1]
PAPR=1 dB, stf_seq=[1.0000−1.4142 1.0000 2.0000−2.0000 2.0000 2.0000 2.0000 2.0000−1.0000 −1.4142 −1.0000]
PAPR=1 dB, stf_seq=[1.0000 1.4142 1.0000 −2.0000 −2.0000 −2.0000 −2.0000 2.0000 −2.0000 −1.0000 1.4142 −1.0000]
PAPR=1 dB, stf_seq=[−1.0000 −1.4142 −1.0000 2.0000 2.0000 2.0000 2.0000 −2.0000 2.0000 1.0000 −1.4142 1.0000]
PAPR=1 dB, stf_seq=[−1.0000 1.4142 −1.0000 −2.0000 2.0000 −2.0000 −2.0000 −2.0000 −2.0000 1.0000 1.4142 1.0000]

FIG. 6C is a diagram illustrating another example 603 of a preamble of an OFDM/A packet tailored for extended range and/or lower rate applications. If a receiver communication device (RX) acquires L-STF of Low Rate preamble, then classification can be made as shown using the normal L-LTF that tells the device that it received and successfully processes the L-STF. Note that this may not be the case for very low SINR conditions where low rate packets are expected to work.

FIG. 7A is a diagram illustrating another example 701 of a preamble of an OFDM/A packet tailored for extended range and/or lower rate applications. If a RX did not successfully acquire L-STF of Low Rate preamble (this may be the typical case for very low SINR conditions where low rate packets are expected to work), then in this case, the RX of a device that is configured to try to lock on a low rate preamble needs to know that it did not lock onto the L-STF but rather on the LR-STF. This is enabled by a design as described with reference to FIG. 6B such that the location of LR-STF tones is different from L-STF tones and/or a specific LR-LTF sequence which is orthogonal to L-LTF.

FIG. 7B is a diagram illustrating another example 702 of a preamble of an OFDM/A packet tailored for extended range and/or lower rate applications. This example 702 prepends one of the normal range NEW preambles (with some modification) with a long, known pseudo-noise (PN) sequence. This can allow a device to be configured to acquire frame at very low SNR via the long PN sequence (seq1 and seq2). Also, the PN seq1 is followed by short PN seq2 so that RX can identify the end of the PN portion.

Compatibility with legacy prior standards, protocols, and/or recommended practices is maintained via the inclusion of the normal NEW format. Non-HEW devices (e.g., those not compatible with prior standards, protocols, and/or recommended practices) will not be aware of the long PN sequence, but they will properly decode the L-STF/L-LTF/L-SIG.

A modified NEW preamble is similar, but not identical, to one of the previously proposed NEW preamble designs. This modified NEW preamble begins with L-STF/L-LTF/L-SIG. The code rate of all fields modified (e.g., add time/frequency rep of 2× or greater) so that it can be decoded at low SNR. A device may be configured to know that a frame that begins with PN sequences 1 and 2 are of the extended frame type, and thus are aware of these modifications to the NEW portion of the preamble.

Note also that a new preamble may need to support allowing the device to be configured to perform carrier frequency offset (CFO) estimation with greater accuracy than is possible with current preamble. This can be enabled by adding additional LTF field(s) after the initial SIG field. Also, additional LTF field(s) may always be present, or may be optionally present and signaled with a bit in the SIG field.

FIG. 7C is a diagram illustrating an example 703 of a preamble of an OFDM/A packet that includes at least one cyclically shifted copy of at least one field. A copy or a cyclically shifted copy of any field may be included within a packet. In certain examples, a cyclically shifted copy of a SIG is included after the SIG. Note also that the cyclically shifted copy of a field may separate from the original field by one or more intervening fields if desired.

FIG. 7D is a diagram illustrating another example 704 of a preamble of an OFDM/A packet that includes at least one cyclically shifted copy of at least one field. In this example 704, the 16 μs NEW-SIG symbol is preceded by a cyclically shifted copy of the L-SIG symbol. The L-SIG 3.2 μs symbol is repeated twice followed by the first 0.8 μs of the L-SIG. In other words, denoting the samples of L-SIG as 1:64, the two L-SIG symbols look like [49:64 1:64 1:64 1:16]. This allows for a device to be configured to decode the copy of the L-SIG at any point (the samples are all cyclically rotated) providing up to 4.8 μs of protection from delay spread for decoding of the L-SIG. Also, this allows for a device to be configured to classify the NEW preamble (as opposed to VHT, HT or Legacy preambles) by taking advantage of the repetitions (3.2 μs) similarly to the LTF repetition. For example, if the device is configured to decode L-SIG 3.2 μs (micro-seconds) after the original cyclically shifted copy, then it is certain that it is a HEW packet. Alternatively, the device may be configured to perform a 3.2 μs lag auto-correlator to detect the presence of the cyclically shifted copy.

Also, the cyclically shifted copy of the L-SIG field can be truncated to a shorter duration (<4 μs). The NEW-SIG symbol uses the L-LTF and optionally uses pilots embedded in that symbol for channel estimation. Alternatively, the new SIG can be preceded by a DC4 LTF signal. The NEW SIG symbol may use the short GI. Combining with a truncated L-SIG can allow for a savings of 4 µs. The NEW-STF field may use a fixed design irrespective of the DC signaled in the NEW-SIG.

FIG. 8A is a diagram illustrating an example 801 of SIG information modulated on only even (or odd) sub-carriers (SCs) within a set of OFDM/A sub-carriers. A set of sub-carriers includes even and odd sub-carriers therein. SIG information may be modulated on only the even sub-carriers within the set. Alternatively, SIG information may be modulated on only the odd sub-carriers with the set. The other sub-carriers are devoid of any information modulated thereon. Note that certain examples include use of some of the carriers that did not include SIG information modulated thereon for other uses (e.g., pilot information). Also, note that the set of sub-carriers that include the even or odd sub-carriers on which SIG information is modulated may include all or less than all available sub-carriers. Note also that any desired grouping of sub-carriers may be selected (e.g., every Xth sub-carrier, where X is an integer; the first Y sub-carriers, the next Z sub-carriers, etc.).

FIG. 8B is a diagram illustrating an example 802 of data modulated on all sub-carriers (SCs) within a set of OFDM/A sub-carriers. Data, such as data included within at least one OFDM symbol of a data field or payload, is modulated across all sub-carriers within the set of OFDM sub-carriers.

FIG. 8C is a diagram illustrating an example 803 of different types of modulations or modulation coding sets (MCSs) used for modulation of information within different fields within an OFDM/A packet. Dated may be modulated using various modulation coding techniques. Examples of such modulation coding techniques may include binary phase shift keying (BPSK), quadrature phase shift keying (QPSK) or quadrature amplitude modulation (QAM), 8-phase shift keying (PSK), 16 quadrature amplitude modulation (QAM), 32 amplitude and phase shift keying (APSK), 64-QAM, etc., uncoded modulation, and/or any other desired types of modulation including higher ordered modulations that may include even greater number of constellation points (e.g., 1024 QAM, etc.). Generally, data within a packet may be modulated using a relatively higher-ordered modulation/modulation coding sets (MCSs) than is used for modulating SIG information. Relatively lower-ordered modulation/MCS may be used for the SIG information to ensure reception by a recipient device (e.g., being relatively more robust, easier to demodulate, decode, etc.).

FIG. 8D is a diagram illustrating an example 804 of different types of transmission (TX) power used for different sub-carriers within at least one OFDM/A symbol of at least one OFDM/A packet. SIG information that is included only on the even (or odd) sub-carriers may be transmitted using a relatively higher power per sub-carrier then is used to transmit data. On average, the total amount of transmission power across the sub-carriers of the SIG may be approximately the same, but since only half of the sub-carriers within the set are used for modulated SIG information, the transmit power per sub-carrier may be approximately double relative to the transmit power per sub-carrier used for modulated data across all sub-carriers.

FIG. 9A is a diagram illustrating an embodiment of a method 901 for execution by at least one wireless communication device. The method 901 begins by generating a preamble for an OFDM/A packet that includes at least one OFDM/A symbol that includes at least one SIG having SIG information modulated on only even sub-carriers and are devoid of any information modulated on odd sub-carriers of a set of OFDM/A sub-carriers (block 910). The method 901 continues by transmitting the OFDM/A packet to another wireless communication device (block 920) via a communication interface of the at least one wireless communication device.

FIG. 9B is a diagram illustrating another embodiment of a method 902 for execution by at least one wireless communication device. The method 902 begins by generating a preamble for an OFDM/A packet that includes at least one OFDM/A symbol that includes at least one SIG having SIG information modulated on only even sub-carriers and are devoid of any information modulated on odd sub-carriers of a set of OFDM/A sub-carriers (block 911). The method 902 continues by generating a payload for the OFDM/A packet that includes at least one OFDM/A symbol that includes data modulated on all sub-carriers of the set of OFDM/A sub-carriers (block 921). The method 902 continues by transmitting the OFDM/A packet to another wireless communication device (block 931) via a communication interface of the at least one wireless communication device.

FIG. 9C is a diagram illustrating another embodiment of a method 903 for execution by at least one wireless communication device. The method 902 begins by receiving (e.g., via the communication interface and from another wireless communication device) an OFDM/A packet that includes at least one OFDM/A symbol (block 912). The method 902 continues by processing a preamble of the OFDM/A packet within the at least one OFDM/A symbol to determine on which sub-carriers of a set of OFDM/A sub-carriers signal field (SIG) information is modulated (block 922).

When it is determined that SIG information is modulated on only even sub-carriers of the set of OFDM/A sub-carriers and odd sub-carriers of the set of OFDM/A sub-carriers are devoid of any information modulated thereon (block 932), the method 903 branches to classify the OFDM/A packet as first IEEE 802.11 communication standard based packet and process the OFDM/A packet based on the first IEEE 802.11 communication standard (block 942). Alternatively, when it is determined that SIG information is modulated on all sub-carriers of the set of OFDM/A sub-carriers (block 932), the method 903 branches to classify the OFDM/A packet as second IEEE 802.11 communication standard based packet and process the OFDM/A packet based on the second IEEE 802.11 communication standard (block 944). If desired in an optional step, the method 903 operates by processing the OFDM/A packet based on at least one operation associated with the classified IEEE 802.11 type (block 952). Alternatively, the method 903 may operate to discard the packet when it is classified to be of a type that cannot be processed (e.g., such as when a device does not include capability to process such a packet) (also block 952). Alternatively, the method 903 may discard the packet when it cannot be successfully classified as any known type.

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
a processor, at least one of the processor or the communication interface configured to:
generate a preamble for an orthogonal frequency division multiplexing (OFDM) packet that includes the preamble and a payload, wherein the payload includes data modulated on all sub-carriers of a set of OFDM sub-carriers, and that includes at least one OFDM symbol that includes at least one signal field (SIG) having SIG information modulated on only even sub-carriers of the set of OFDM sub-carriers, wherein odd sub-carriers of the set of OFDM sub-carriers are devoid of any information modulated thereon; and
transmit the OFDM packet to another wireless communication device using a first transmission power for each of the even sub-carriers of the set of OFDM sub-carriers that includes the SIG information modulated in the preamble that is approximately double a second transmission power for each of the sub-carriers that includes the data modulated in the payload.

2. The wireless communication device of claim 1 further comprising:
a laptop computer, a tablet, a personal digital assistant, a personal computer, or a cellular telephone.

3. The wireless communication device of claim 1, wherein the at least one of the processor or the communication interface is further configured to:
generate the OFDM packet that includes the preamble and the payload, wherein the payload includes the data modulated on the all sub-carriers of the set of OFDM sub-carriers using first modulation coding set (MCS) that is a higher ordered MCS and includes a higher number of constellation points relative to second MCS used for the SIG information modulated on only the even sub-carriers of the set of OFDM sub-carriers.

4. The wireless communication device of claim 1, wherein the at least one of the processor or the communication interface is further configured to:
generate the preamble for the OFDM packet that includes another OFDM symbol that includes another SIG having other SIG information corresponding to a first IEEE 802.11 communication standard that is modulated on the all sub-carriers of the set of OFDM sub-carriers, wherein the other SIG is followed by the at least one signal field (SIG) includes first, second, and third SIGs having first, second, and third SIG information corresponding to a second IEEE 802.11 communication standard, wherein the first IEEE 802.11 communication standard is legacy relative to the second IEEE 802.11 communication standard, wherein the first SIG includes first OFDM symbol having first SIG information modulated on only the even sub-carriers of the set of OFDM sub-carriers and is devoid of any information modulated on the odd sub-carriers of the set of OFDM sub-carriers, the second SIG includes second OFDM symbol having second SIG information modulated on only the even sub-carriers of the set of OFDM sub-carriers and is devoid of any information modulated on the odd sub-carriers of the set of OFDM sub-carriers, and the third SIG includes third at least one OFDM symbol having third SIG information, and wherein length of the third SIG and number of OFDM symbols within the third at least one OFDM symbol is indicated by at least one of the first SIG or the second SIG.

5. The wireless communication device of claim 1, wherein the at least one of the processor or the communication interface is further configured to:
generate the preamble for the OFDM packet that includes another OFDM symbol that include another SIG having other SIG information corresponding to a first IEEE 802.11 communication standard that is modulated on the all sub-carriers of the set of OFDM sub-carriers, wherein the other SIG is followed by the at least one signal field (SIG) includes first, second, and third SIGs having first, second, and third SIG information corresponding to a second IEEE 802.11 communication standard, wherein the first IEEE 802.11 communication standard is legacy relative to the second IEEE 802.11 communication standard, wherein the first SIG includes first OFDM symbol having first SIG information modulated on only the even sub-carriers of the set of OFDM sub-carriers and is devoid of any information modulated on the odd sub-carriers of the set of OFDM sub-carriers, the second SIG includes second OFDM symbol having second SIG information modulated on only the even sub-carriers of the set of OFDM sub-carriers and is devoid of any information modulated on the odd sub-carriers of the set of OFDM sub-carriers, and the third SIG includes third two or more OFDM symbols having third SIG information, and wherein length of the third SIG and number of OFDM symbols within the third two or more OFDM symbols is indicated by 90 degree phase rotation of a last of the third two or more OFDM symbols relative to other OFDM symbols of the third two or more OFDM symbols.

6. The wireless communication device of claim 1, wherein the at least one of the processor or the communication interface is further configured to:
generate the preamble for the OFDM packet that includes two other SIGs that include a first SIG having other SIG information corresponding to a first IEEE 802.11 communication standard and a second SIG having cyclically shifted copy of the other SIG information corresponding to the first IEEE 802.11 communication standard, wherein the two other SIGs are followed by the at least one SIG having the SIG information, wherein the SIG information corresponds to a second IEEE 802.11 communication standard, wherein the first IEEE 802.11 communication standard is legacy relative to the second IEEE 802.11 communication standard.

7. The wireless communication device of claim 1 further comprising:
an access point (AP), wherein the another wireless communication device is a wireless station (STA).

8. The wireless communication device of claim 1 further comprising:
a wireless station (STA), wherein the another wireless communication device is an access point (AP) or another STA.

9. A wireless communication device comprising:
a communication interface; and
a processor, at least one of the processor or the communication interface configured to:
receive, from another wireless communication device, an orthogonal frequency division multiplexing (OFDM) packet that includes at least one OFDM symbol;
process a preamble of the OFDM packet within the at least one OFDM symbol to determine on which sub-carriers of a set of OFDM sub-carriers signal field (SIG) information is modulated;
classify, when SIG information is modulated on only even sub-carriers of the set of OFDM sub-carriers and when odd sub-carriers of the set of OFDM sub-carriers are devoid of any information modulated thereon, the OFDM packet as first IEEE 802.11 communication standard based packet and process the OFDM packet based on the first IEEE 802.11 communication standard; and
classify, when SIG information is modulated on all sub-carriers of the set of OFDM sub-carriers, the OFDM packet as second IEEE 802.11 communication standard based packet and process the OFDM packet based on the second IEEE 802.11 communication standard.

10. The wireless communication device of claim 9, wherein the at least one of the processor or the communication interface is further configured to:
process the preamble of the OFDM packet to determine a last OFDM symbol of a plurality of OFDM symbols that includes the SIG information based on information included within at least one other OFDM of the plurality of OFDM symbols that precedes the last OFDM symbol.

11. The wireless communication device of claim 9, wherein the at least one of the processor or the communication interface is further configured to:
process the preamble of the OFDM packet to determine a last OFDM symbol of a plurality of OFDM symbols that includes the SIG information based on a 90 degree phase rotation of last OFDM symbols relative to other OFDM symbols of the plurality of OFDM symbols that precedes the last OFDM symbol.

12. The wireless communication device of claim 9, wherein the at least one of the processor or the communication interface is further configured to:
process the OFDM packet, when the OFDM packet is classified as the first IEEE 802.11 communication standard based packet, by demodulating SIG information from only the even sub-carriers of the set of OFDM sub-carriers within the at least one OFDM symbol of the preamble of the OFDM packet and by demodulating data from the all sub-carriers of the set of OFDM sub-carriers within other at least one OFDM symbol of a payload of the OFDM packet.

13. The wireless communication device of claim 9 further comprising:
a wireless station (STA), wherein the another wireless communication device is an access point (AP) or another STA.

14. A method for execution by a wireless communication device, the method comprising:
generating a preamble for an orthogonal frequency division multiplexing (OFDM) packet that includes the preamble and a payload that includes at least one OFDM symbol that includes at least one signal field (SIG) having SIG information modulated on only even sub-carriers of a set of OFDM sub-carriers, wherein odd sub-carriers of the set of OFDM sub-carriers are devoid of any information modulated thereon, wherein the payload includes data modulated on all sub-carriers of the set of OFDM sub-carriers using first modulation coding set (MCS) that is a higher ordered MCS and includes a higher number of constellation points relative to second MCS used for the SIG information modulated on only the even sub-carriers of the set of OFDM sub-carriers; and
transmitting, via a communication interface of the wireless communication, the OFDM packet to another wireless communication device.

15. The method of claim 14 further comprising:
transmitting, via the communication interface of the wireless communication, the OFDM packet to the another wireless communication device using a first transmission power for each of the even sub-carriers of the set of OFDM sub-carriers that includes the SIG information modulated in the preamble that is approximately double a second transmission power for each of the sub-carriers that includes the data modulated in the payload.

16. The method of claim 14, wherein the wireless communication device includes a laptop computer, a tablet, a personal digital assistant, a personal computer, or a cellular telephone.

17. The method of claim 14 further comprising:
generating the preamble for the OFDM packet that includes another OFDM symbol that include another SIG having other SIG information corresponding to a first IEEE 802.11 communication standard that is modulated on the all sub-carriers of the set of OFDM sub-carriers, wherein the other SIG is followed by the at least one signal field (SIG) includes first, second, and third SIGs having first, second, and third SIG information corresponding to a second IEEE 802.11 communication standard, wherein the first IEEE 802.11 communication standard is legacy relative to the second IEEE 802.11 communication standard, wherein the first SIG includes first OFDM symbol having first SIG information modulated on only the even sub-carriers of the set of OFDM sub-carriers and is devoid of any information modulated on the odd sub-carriers of the set of OFDM sub-carriers, the second SIG includes second OFDM symbol having second SIG information modulated on only the even sub-carriers of the set of OFDM sub-carriers and is devoid of any information modulated on the odd sub-carriers of the set of OFDM sub-carriers, and the third SIG includes third at least one OFDM symbol having third SIG information, and wherein length of the third SIG and number of OFDM symbols within the third at least one OFDM symbol is indicated by at least one of the first SIG or the second SIG.

18. The method of claim 14 further comprising:

generating the preamble for the OFDM packet that includes another OFDM symbol that include another SIG having other SIG information corresponding to a first IEEE 802.11 communication standard that is modulated on the all sub-carriers of the set of OFDM sub-carriers, wherein the other SIG is followed by the at least one signal field (SIG) includes first, second, and third SIGs having first, second, and third SIG information corresponding to a second IEEE 802.11 communication standard, wherein the first IEEE 802.11 communication standard is legacy relative to the second IEEE 802.11 communication standard, wherein the first SIG includes first OFDM symbol having first SIG information modulated on only the even sub-carriers of the set of OFDM sub-carriers and is devoid of any information modulated on the odd sub-carriers of the set of OFDM sub-carriers, the second SIG includes second OFDM symbol having second SIG information modulated on only the even sub-carriers of the set of OFDM sub-carriers and is devoid of any information modulated on the odd sub-carriers of the set of OFDM sub-carriers, and the third SIG includes third two or more OFDM symbols having third SIG information, and wherein length of the third SIG and number of OFDM symbols within the third two or more OFDM symbols is indicated by 90 degree phase rotation of a last of the third two or more OFDM symbols relative to other OFDM symbols of the third two or more OFDM symbols.

19. The method of claim 14 further comprising:

generating the preamble for the OFDM packet that includes two other SIGs that include a first SIG having other SIG information corresponding to a first IEEE 802.11 communication standard and a second SIG having cyclically shifted copy of the other SIG information corresponding to the first IEEE 802.11 communication standard, wherein the two other SIGs are followed by the at least one SIG having the SIG information, wherein the SIG information corresponds to a second IEEE 802.11 communication standard, wherein the first IEEE 802.11 communication standard is legacy relative to the second IEEE 802.11 communication standard.

20. The method of claim 14, wherein the wireless communication device is a wireless station (STA), wherein the another wireless communication device is an access point (AP) or another STA.

* * * * *